US012798607B2

(12) United States Patent
Mulligan et al.

(10) Patent No.: US 12,798,607 B2
(45) Date of Patent: Nov. 17, 2026

(54) PREDICTABILITY ESTIMATION USING BEHAVIOR PREDICTION MODELS

(71) Applicant: Waymo LLC, Mountain View, CA (US)

(72) Inventors: Jonathan James Mulligan, San Francisco, CA (US); Oskar Erik Sandberg, Sunnyvale, CA (US); Chung Kei Wong, Milpitas, CA (US); Kasturi Rangan Raghavan, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 538 days.

(21) Appl. No.: 17/892,969

(22) Filed: Aug. 22, 2022

(65) Prior Publication Data

US 2024/0059312 A1 Feb. 22, 2024

(51) Int. Cl.
*B60W 60/00* (2020.01)
*B60W 50/00* (2006.01)
*G06N 5/022* (2023.01)

(52) U.S. Cl.
CPC ...... *B60W 60/001* (2020.02); *B60W 50/0097* (2013.01); *G06N 5/022* (2013.01); *B60W 2552/05* (2020.02)

(58) Field of Classification Search
CPC ........... B60W 60/001; B60W 50/0097; B60W 2552/05; G06N 5/022
See application file for complete search history.

(56) References Cited

U.S. PATENT DOCUMENTS 11,541,909 B1 * 1/2023 Poubel Orenstein ........................ B60W 60/0013
2018/0173237 A1 * 6/2018 Reiley .................. B60Q 1/5035
2018/0259967 A1 * 9/2018 Frazzoli ............ B60W 30/0956
2019/0072966 A1 * 3/2019 Zhang .................... G05D 1/646
(Continued)

OTHER PUBLICATIONS

Casas et al., "Spagnn: Spatially-aware graph neural networks for relational behavior forecasting from sensor data," 2020 IEEE International Conference on Robotics and Automation (ICRA), May 31, 2020, 7 pages.
(Continued)

*Primary Examiner* — Rachid Bendidi
*Assistant Examiner* — Neit J. Nieves Flores
(74) *Attorney, Agent, or Firm* — Fish & Richardson P.C.

(57) ABSTRACT

Methods, systems, and apparatus, including computer programs encoded on a computer storage medium, for predictability estimation using a behavior prediction model. One of the methods includes receiving a candidate future behavior to be performed by an agent in an environment after a current time point; receiving data characterizing a scene that includes the agent in the environment as of the current time point; processing a behavior prediction input generated from the data using a behavior prediction model, wherein the behavior prediction model is configured to receive the behavior prediction input and to process the behavior prediction input to generate a behavior prediction output that characterizes a set of predicted future behaviors for the agent after the current time point; and determining a predictability score for the candidate future behavior by comparing the candidate future behavior with the behavior prediction output.

20 Claims, 4 Drawing Sheets

(56) References Cited

U.S. PATENT DOCUMENTS

| | | | | |
|---|---|---|---|---|
| 2019/0072973 | A1* | 3/2019 | Sun | B62D 15/025 |
| 2019/0217857 | A1* | 7/2019 | Sorin | B60W 30/09 |
| 2019/0369626 | A1* | 12/2019 | Lui | G05D 1/0221 |
| 2020/0097008 | A1* | 3/2020 | Sadat | B60W 50/0097 |
| 2021/0046924 | A1* | 2/2021 | Caldwell | B60W 30/09 |
| 2021/0200230 | A1* | 7/2021 | Ross | G05D 1/0088 |
| 2022/0169278 | A1* | 6/2022 | Refaat | G06F 18/214 |

OTHER PUBLICATIONS

Ngiam et al., "Scene Transformer: A unified architecture for predicting multiple agent trajectories," CoRR, Jun. 15, 2021, arXiv:2106.08417, 25 pages.
Refaat et al., "Agent prioritization for autonomous navigation," 2019 IEEE/IRSJ International Conference on Intelligent Robots and Systems (IROS), Nov. 3-8, 2019, 8 pages.
Schwarting et al., "Social behavior for autonomous vehicles," PNAS, Dec. 10, 2019, 116(50):24972-24978.
Varadarajan et al., "MultiPath+ +: Efficient Information Fusion and Trajectory Aggregation for Behavior Prediction," CoRR, Nov. 29, 2021, arXiv:2111.14973, 22 pages.

* cited by examiner

PREDICTABILITY ESTIMATION USING BEHAVIOR PREDICTION MODELS

BACKGROUND

This specification relates to autonomous vehicles.

Autonomous vehicles include self-driving cars, boats, and aircrafts. Autonomous vehicles use a variety of on-board sensors and computer systems to detect nearby objects and use such detections to make control and navigation decisions. Some autonomous vehicles can use a variety of on-board sensors and computer systems to predict nearby objects' behavior and trajectory. Predicting a road user's behavior and trajectory correctly and timely is one of the keys to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes systems and techniques for estimating predictability of a candidate future behavior to be performed by a vehicle, e.g., an autonomous or semi-autonomous vehicle, in an environment after a current time point.

A vehicle may need to change a current navigation plan, e.g., in response to a reroute request. The on-board system of the vehicle can generate a candidate future behavior in response to the need to change the current navigation plan. However, performing a candidate future behavior, e.g., a future route or a future trajectory, that is unpredictable to other road users in the environment can be potentially unsafe. Predictability of a given behavior measures the degree to which other road users will expect the vehicle to perform the behavior.

The systems and methods described in this specification can use a behavior prediction model to generate a behavior prediction output that characterizes a predicted future behavior for the vehicle from the perspective of other road users. The predicted future behavior for the vehicle from the perspective of other road users can be a predicted future behavior predicted based on information observable by the other road users in the scene. The systems and methods can determine a predictability score for a candidate future behavior to be performed by the vehicle by comparing the candidate future behavior with the behavior prediction output. The predictability score can characterize whether the candidate future behavior is predictable for other road users of the environment. The systems and methods can determine whether to cause the vehicle to perform the candidate future behavior based at least on the predictability score.

In general, one innovative aspect of the subject matter described in this specification can be embodied in methods that include the actions of receiving a candidate future behavior to be performed by an agent in an environment after a current time point; receiving data characterizing a scene that includes the agent in the environment as of the current time point; processing a behavior prediction input generated from the data using a behavior prediction model, wherein the behavior prediction model is configured to receive the behavior prediction input and to process the behavior prediction input to generate a behavior prediction output that characterizes a set of predicted future behaviors for the agent after the current time point; and determining a predictability score for the candidate future behavior by comparing the candidate future behavior with the behavior prediction output, wherein the predictability score for the candidate future behavior characterizes whether the candidate future behavior is predictable for other road users of the environment. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The agent is an autonomous vehicle. Determining the predictability score for the candidate future behavior includes: determining a route consistency score by comparing the candidate future behavior for the agent with the set of predicted future behaviors included in the behavior prediction output for the agent; and determining the predictability score for the candidate future behavior based at least on the route consistency score. Determining the predictability score for the candidate future behavior include: determining an action type consistency score by comparing an action type of the candidate future behavior for the agent with a set of predicted future actions included in the behavior prediction output for the agent; and determining the predictability score for the candidate future behavior based at least on the action type consistency score. The actions further include obtaining a status of a turn indicator of the agent at the current time point; obtaining a turning plan for the candidate future behavior, wherein the turning plan characterizes a turn action or a no turn action to be performed by the agent after the current time point; and determining a turn consistency score for the candidate future behavior by comparing the turning plan for the candidate future behavior with the status of the turn indicator, wherein the turn consistency score for the candidate future behavior characterizes whether the candidate future behavior results a future turning behavior that is consistent with a turning behavior signaled by the turn indicator of the agent at the current time point. The actions further include determining that the agent is within a threshold distance from an intersection at the current time point; and in response to determining the agent is within the threshold distance from the intersection at the current time point, determining a combined score for the candidate future behavior by combining the turn consistency score for the candidate future behavior and the predictability score for the candidate future behavior. The actions further include determining whether to cause the agent to perform the candidate future behavior based at least on the predictability score. The candidate future behavior is generated in response to a reroute request that requires the agent to change a current navigation plan in the environment. The candidate future behavior include a candidate future route to be performed by the agent after the current time point, wherein the behavior prediction output includes a respective likelihood for each of one or more predicted future trajectories for the agent after the current time point, wherein determining the predictability score for the candidate future behavior includes: for each of the one or more predicted future trajectories, generating a projection of the predicted future trajectory by projecting the predicted future trajectory to a road graph; and determining a matching score between the candidate future route and the projection of the predicted future trajectory on the road graph; and determining the predictability score for the candidate future behavior by aggregating the respective likelihood for each of the one or more predicted future trajectories using the respective matching score. The candidate future behavior includes a candidate future route to be performed by the agent after the current time point, wherein the behavior prediction output includes a respective likelihood for each of one or more predicted future routes for the agent after the current time point, wherein determining the predictability score for the candidate future behavior includes: for each of the one or more predicted future routes, determining a matching score between the candidate future route and the predicted future route on a road graph; and determining the predictability score for the candidate future behavior by aggregating the respective likelihood for each of the one or more predicted future routes using the respective matching score. The candidate future behavior includes a candidate future trajectory to be performed by the agent after the current time point, wherein the behavior prediction output includes a respective likelihood for each of one or more predicted future trajectories for the agent after the current time point, wherein determining the predictability score for the candidate future behavior includes: generating a projection of the candidate future trajectory by projecting the candidate future trajectory to a road graph; for each of the one or more predicted future trajectories, generating a projection of the predicted future trajectory by projecting the predicted future trajectory to the road graph; and determining a matching score between the projection of the candidate future trajectory and the projection of the predicted future trajectory on the road graph; and determining the predictability score for the candidate future behavior by aggregating the respective likelihood for each of the one or more predicted future trajectories using the respective matching score. the candidate future behavior includes a candidate future trajectory to be performed by the agent after the current time point, wherein the behavior prediction output includes a respective likelihood for each of one or more predicted future routes for the agent after the current time point, wherein determining the predictability score for the candidate future behavior includes: generating a projection of the candidate future trajectory by projecting the candidate future trajectory to a road graph; for each of the one or more predicted future routes, determining a matching score between the candidate future trajectory and the predicted future route on the road graph; and determining the predictability score for the candidate future behavior by aggregating the respective likelihood for each of the one or more predicted future routes using the respective matching score. The actions further include determining a violation score for the candidate future behavior by comparing the candidate future behavior with a rule of a road in the environment; and determining a combined score for the candidate future behavior by combining at least the violation score for the candidate future behavior and the predictability score for the candidate future behavior. The actions include receiving a plurality of candidate future behaviors to be performed by the agent in the environment after the current time point; and determining a respective predictability score for each candidate future behavior of the plurality of candidate future behaviors by comparing each candidate future behavior with the behavior prediction output.

Particular embodiments of the subject matter described in this specification can be implemented so as to realize one or more of the following advantages.

The systems and methods described in this specification can more accurately evaluate a candidate future behavior to be performed by a vehicle by generating a predictability score for the candidate future behavior characterizing whether the candidate future behavior is predictable for other road users of the environment, for one or more operators or passengers inside the vehicle, or both. An unpredictable candidate future behavior, e.g., an unpredictable future route or an unpredictable future trajectory, can be penalized or avoided, improving the safety of the autonomous or semi-autonomous navigation of the vehicle, and improving the safety of other road users. In some implementations, the systems and methods can select a future behavior to be performed by the vehicle that is consistent with a previously signaled intent by the vehicle.

In some implementations, the systems and methods can use a behavior prediction model that was developed to generate a behavior prediction output for other road users to generate a behavior prediction output for the vehicle itself, without the need to develop or re-train a new behavior prediction model. Therefore, the systems and methods are computationally efficient because no additional training data needs to be collected and no additional training needs to be performed. When running the behavior prediction model on-board the vehicle, memory usage can be reduced because the system does not need additional memory to store a new behavior prediction model.

In some implementations, the systems and methods can more accurately evaluate a candidate future behavior using a combined predictability score that is a combination of the predictability score and other safety measures, e.g., a turn consistency score for the candidate future behavior that characterizes whether the candidate future behavior results in a future turning behavior or lane change behavior that is consistent with a behavior signaled by a turn indicator of the vehicle at the current time point, a violation score for the candidate future behavior that characterizes whether the candidate future behavior violates a rule of a road in the environment, and so on.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a behavior prediction model to generate a behavior predictability score for a candidate future behavior to be performed by the vehicle after a current time point.

Figure 1:
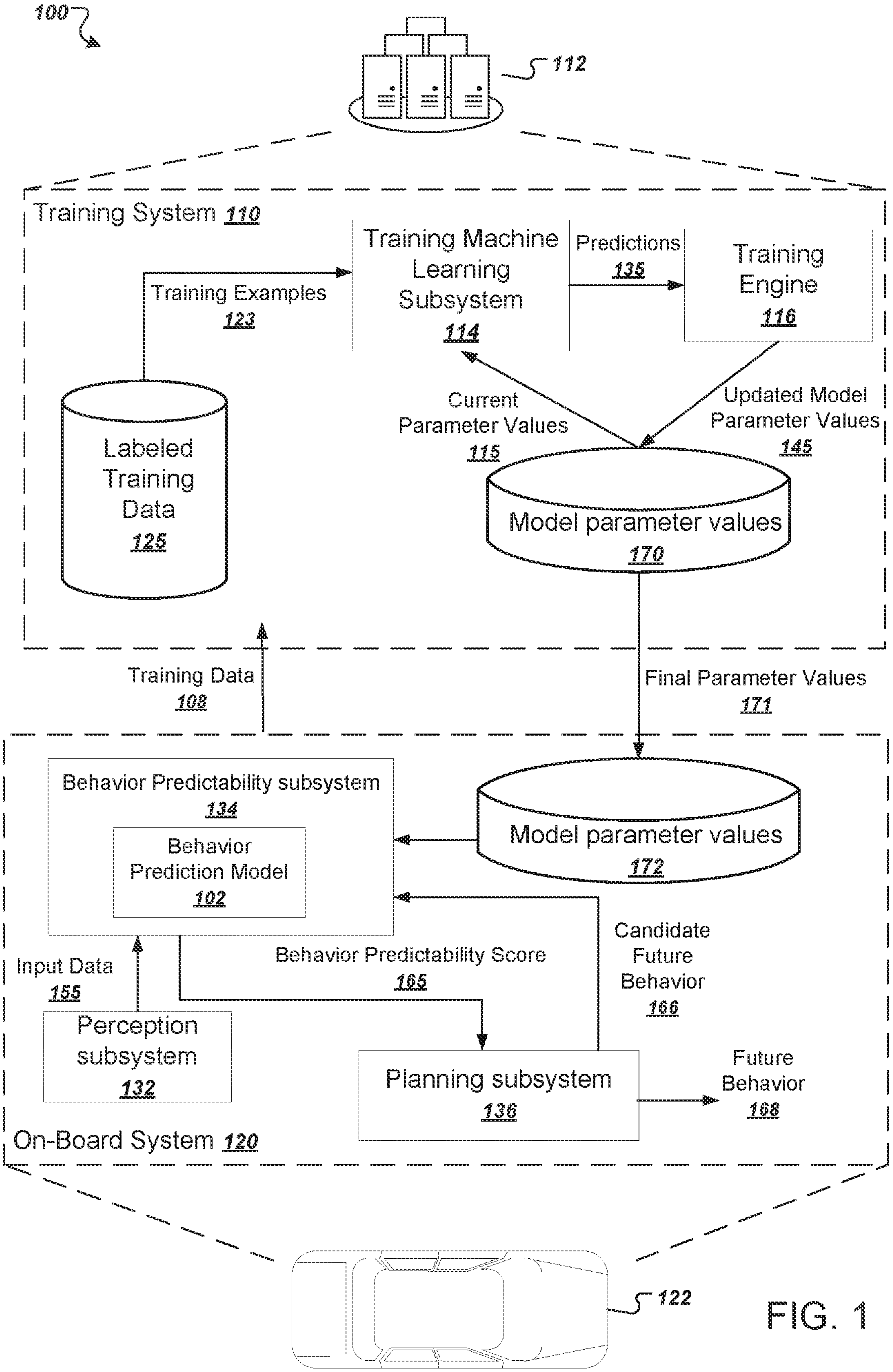
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. In some cases, the vehicle 122 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 122 can autonomously apply the brakes if a prediction indicates that a human driver is about to collide with another vehicle. As another example, the vehicle 122 can have an advanced driver assistance system (ADAS) that assists a human driver of the vehicle 122 in driving the vehicle 122 by detecting potentially unsafe situations and alerting the human driver or otherwise responding to the unsafe situation. As a particular example, the vehicle 122 can alert the driver of the vehicle 122 or take an autonomous driving action when an obstacle is detected, when the vehicle departs from a driving lane, or when an object is detected in a blind spot of the human driver.

The on-board system 120 can include a planning subsystem 136 that generates a candidate future behavior 166 to be performed by the vehicle in an environment after a current time point. The candidate future behavior 166 can include, e.g., a candidate future trajectory, a candidate future route, a candidate future action (e.g., a candidate future turn, a candidate future lane change), or a combination of these.

In general, a candidate future trajectory of the vehicle 122 can include locations of the vehicle 122, e.g., coordinates of the vehicle 122 in a coordinate system, or a sequence of heat-maps indicating predicted locations of the vehicle 122, over a future time period after the current time point. In some implementations, the candidate future trajectory of the vehicle 122 can include velocities, speeds, or other information of the vehicle over a future time period after the current time point. A candidate future route of the vehicle 122 can include a plurality of waypoints on a road graph or map of the environment, and the plurality of waypoints can characterize locations of the vehicle 122 over a future time period after the current time point. For example, a candidate future route can include a path on the center lane of a road. In other words, a route describes future travel in terms of spatial locations, independent of time. A trajectory describes future travel in terms of both time and spatial locations, e.g., by specifying a respective waypoint location of the agent at each of multiple future time points, by specifying motion parameters for the agent at each of multiple future time points, or both.

In general, an action of a vehicle can characterize a high level driving maneuver from a set of high-level maneuvers that can be executed by the vehicle. For example, a candidate future action of the vehicle 122 can include a high level driving maneuver to be performed by the vehicle 122 over a future time period after a current time point, e.g., lane changing, stopping, speeding up, slowing down, turning left, turning right, etc.

In some implementations, the planning subsystem 136 can receive a reroute request that may require the vehicle 122 to change a current navigation plan in the environment. The planning subsystem 136 can generate the candidate future behavior 166 in response to the reroute request. For example, during the course of regular operations, an autonomous vehicle may be subject to a reroute. In some cases, an autonomous vehicle can be an unoccupied vehicle and can receive a ride request with a new destination. In some cases, a passenger occupying an autonomous vehicle may change the final destination while the autonomous vehicle is carrying out an existing route. In some cases, the autonomous vehicle may need to reroute due to a change in the local route, e.g., a newly discovered route solution to the same destination. In some cases, the autonomous vehicle may need to reroute due to a change in the environment, e.g., a detour because of road construction or a road closure.

In some implementations, the planning subsystem 136 can receive a reroute request from a control center that controls the vehicle 122, or controls a fleet of vehicles including the vehicle 122. The control center can make navigation plans for the vehicle 122 or the fleet of vehicles using information of the scene and other information obtained by the control center. For example, the control center can coordinate the navigation of the fleet of vehicles for improved safety, efficiency, or to perform a task that requires collaborations between the fleet of vehicles.

In some cases, the candidate future behavior 166 can be unpredictable to other road users, e.g., drivers, passengers, or pedestrians in the environment. The other road users can include one or more operators or passengers inside the vehicle. Predictability of a given behavior measures the degree to which other road users will expect the vehicle to perform the behavior. Thus, predictability of a candidate future behavior is evaluated from the perspective of other road users based on information observable by the other road users in the scene. For example, the candidate future behavior 166 can require the vehicle to take an action that is unpredictable or the opposite of the currently planned action, e.g., making a right turn while the vehicle is currently signaling an intent of a left turn. Performing a candidate future behavior 166 that is unpredictable to other road users in the environment can be potentially unsafe. Thus, it is desirable to evaluate whether a candidate future behavior 166 to be carried out by the vehicle 122 is predictable from the perspective of other road users in the environment before causing the vehicle to carry out the candidate future behavior 166.

For example, at a given time point, the vehicle 122 may be traveling in the middle lane of a road with three lanes, including the left lane, the middle lane, and the right lane. The vehicle can receive a reroute request while the vehicle is changing from the middle lane to the left lane of the road and while the left turn signal of the vehicle 122 is flashing. The reroute request can include a new destination that may cause the planning subsystem 136 to generate a candidate future behavior 166, e.g., a trajectory of changing to the right lane. However, the candidate future behavior 166 is unpredictable to other road users in the environment because the other road users may predict the vehicle 122 would finish changing to the left lane and would not change to the right lane. Thus, it can be unsafe if the vehicle 122 performs the candidate future behavior 166 to suddenly change to the right lane. It can be preferred that the vehicle 122 finishes changing to the left lane and waits for an opportunity to change to the right lane at a later time point.

As another example, at a given time point, the vehicle 122 may be at an intersection when the traffic light is red. The left turn signal of the vehicle 122 is flashing indicating to other road users that the vehicle plans to make a left turn. The vehicle can receive a reroute request that includes a new destination that may cause the planning subsystem 136 to generate a candidate future behavior 166. The candidate future behavior 166 can include an action of going straight. The vehicle 122 needs to determine whether the candidate future behavior 166 is predictable for other road users. Based on the predictability of the candidate future behavior 166, the vehicle 122 can determine to not perform the candidate future behavior 166, e.g., not going straight, because the candidate future behavior 166 can be unpredictable for other road users.

As another example, at a given time point, the vehicle 122 may be signaling to make a turn as it approaches an intersection. The vehicle 122 can receive a reroute request that may cause the planning subsystem 136 to generate a candidate future trajectory of not making the turn. The vehicle 122 needs to determine whether the candidate future behavior 166 is predictable for other road users. Based on the predictability of the candidate future behavior, the vehicle 122 can determine to perform the candidate future behavior, e.g., not making the turn, because the vehicle is sufficiently away from the intersection. For example, the vehicle 122 can determine to carry out the candidate future behavior 166 and stop signaling to make the turn because the vehicle 122 is 100 feet away from the intersection.

As another example, at a current given time point, the vehicle 122 may not be signaling a turn when it receives a reroute request. The vehicle 122 may not carry out a candidate future behavior 166 that would require the vehicle to make a sudden turn or a sudden swerve because making a sudden turn or swerve can be unpredictable for other road users.

In some cases, if the vehicle 122 is at a left-turn only lane, the candidate future behavior 166 requiring the vehicle 122 to go straight can be unpredictable to other road users in the environment because the other road users may predict the vehicle 122 will turn left and will not go straight. Thus, it can be unsafe if the vehicle 122 performs the candidate future behavior 166 to suddenly go straight. It can be preferred that the vehicle carries out the left turn action and trajectory, and generates another route to the new destination.

In some cases, if the vehicle 122 is in a lane that allows a vehicle to turn left or go straight, the candidate future behavior 166 can be less unpredictable if the vehicle stops flashing the left turn signal and goes straight. Thus, it can be safe and efficient if the vehicle 122 performs the candidate future behavior 166 to go straight.

The on-board system 120 includes a behavior predictability subsystem 134 that can be configured to evaluate whether a candidate future behavior 166 to be carried out by the vehicle 122 is predictable from the perspective of other road users in the environment. The on-board system 120 receives, as input, the candidate future behavior 166 and input data 155 characterizing a scene that includes the vehicle 122 in an environment, and generates, as output, a behavior predictability score 165 for the candidate future behavior 166. The behavior predictability score 165 characterizes whether the candidate future behavior 166 is predictable for the other road users of the environment. The other road users can include a nearby agent or an agent in a vicinity of the vehicle 122.

In some implementations, the behavior predictability score 165 can be a cost or penalty that is lower when the candidate future behavior 166 is more predictable for the other road users, and is higher when the candidate future behavior 166 is less predictable for the other road users. For example, the behavior predictability score 165 can be 1 if the candidate future behavior 166 is totally unexpected or the opposite of what is expected for the other road users, providing a high penalty or cost to the selection of the candidate future behavior 166. The behavior predictability score 165 can be 0, if the candidate future behavior 166 is exactly the same as what is expected for the other road users, providing a low penalty or cost to the selection of the candidate future behavior 166.

In some implementations, the behavior predictability score 165 can be a behavior consistency score that is higher when the candidate future behavior 166 is more predictable for the other road users, and is lower when the candidate future behavior 166 is less predictable for the other road users. For example, the behavior predictability score 165 can be 0 if the candidate future behavior 166 is totally unexpected or the opposite of what is expected for the other road users. The behavior predictability score 165 can be 1, or some other maximum value, if the candidate future behavior 166 is exactly the same as what is expected for the other road users.

The on-board system 120 includes a perception subsystem 132. The input to the perception subsystem 132 can include sensor data from a combination of sensor components that receive reflections of electromagnetic radiation, e.g., one or more of lidar systems that detect reflections of laser light, radar systems that detect reflections of radio waves, or camera systems that detect reflections of visible light. In some implementations, the input to the perception subsystems 132 can include predetermined environment information, e.g., information identifying lanes, traffic signs, crosswalks, and other roadway features that can be found in a road graph or map of the environment. In some implementations, the input to the perception subsystem 132 can include log data saved at a storage subsystem of the vehicle 122, at a remote server, or a combination of both. The log data can characterize the navigation history of the vehicle 122, e.g., trajectory, route, speed, turn signal, or a combination of these, over a previous period of time that is earlier than a current time point.

Using the predetermined environment information, the sensor data, the log data, or a combination of these, the perception subsystem 132 can generate input data 155 characterizing a scene that includes the vehicle 122 and one or more agents in an environment. The agents can be other road users, e.g., vehicles, cyclists, pedestrians, and so on. In some implementations, the input data 155 can include information that is observable by the other agents in the scene and does not include any privileged information not observable by the other agents, e.g., future route plans. In some implementations, the perception subsystem 132 can transform the predetermined environment information, the sensor data, the log data, or a combination of these, into an agent-centric coordinate system. Thus, the input data 155 can be in the agent-centric coordinate system with an origin centering at or near an agent in the vicinity of the vehicle.

The input data 155 can include information of the vehicle 122, e.g., vehicle type, vehicle status (e.g., a status of a turn indicator, driver activity), vehicle trajectory (e.g., historical trajectory over a previous period of time), vehicle coordinates, vehicle speed, vehicle heading, and vehicle curvature, etc., information of one or more surrounding agents, information of the environment, e.g., traffic lights, stop signs, etc. For example, the input data 155 characterizing a scene that includes the vehicle 122 in the environment can include location and speed data of the agent over a period of time stored in the log data, road information (e.g., lanes and stop signs), locations of surrounding objects (e.g., other vehicles and pedestrians), etc.

The perception subsystems 132 can provide the input data 155 to the behavior predictability subsystem 134. In some implementations, the behavior predictability subsystem 134 can receive data characterizing the scene that includes the vehicle 122 from other computing devices, or subsystems of the vehicle 122.

The behavior predictability subsystem 134 includes a behavior prediction model 102. The behavior prediction model 102 can receive a behavior prediction input generated from the input data 155 and can process the behavior prediction input to generate a behavior prediction output that characterizes a set of predicted future behaviors for the vehicle 122 after the current time point. For example, the set of predicted future behaviors can include a set of predicted future trajectories, or a set of predicted future routes, or both. The behavior prediction output for the vehicle 122 can characterize what other road users predict the vehicle 122 might do after the current time point. In some implementations, the behavior prediction output can include parameters of a distribution over future behaviors, e.g., parameters of a Gaussian mixture model or other distribution over predicted trajectories or routes. For example, the set of predicted future routes or trajectories can be generated by sampling future routes or trajectories from the distribution or can be generated using the anchors of the Gaussian mixture model. In some implementations, the behavior prediction output can include a respective probability for each behavior in a discrete set of future behaviors. For example, the behavior prediction output for the vehicle 122 can include a respective score for each of one or more predicted future trajectories or routes for the vehicle 122 after the current time point.

The behavior prediction model 102 can be a machine learning model, e.g., a neural network model or other types of machine learning model, trained on training data. For example, the behavior prediction model 102 can be a transformer neural network model (Ngiam, Jiquan, et al. "Scene Transformer: A unified architecture for predicting multiple agent trajectories." arXiv preprint arXiv: 2106.08417 (2021)), a convolutional neural network (e.g., Casas, Sergio, et al. "Spagnn: Spatially-aware graph neural networks for relational behavior forecasting from sensor data." 2020 IEEE International Conference on Robotics and Automation (ICRA). IEEE, 2020, and Refaat, Khaled S., et al. "Agent prioritization for autonomous navigation." 2019 IEEE/RSJ International Conference on Intelligent Robots and Systems (IROS). IEEE, 2019), a MultiPath++neural network model that uses multi-context gating (Varadarajan, Balakrishnan, et al. "MultiPath++: Efficient Information Fusion and Trajectory Aggregation for Behavior Prediction." arXiv preprint arXiv: 2111.14973 (2021)), etc.

In some implementations, the behavior prediction model 102 can be a model that was previously developed and trained to generate a behavior prediction output for other agents in the vicinity of the vehicle. For example, the behavior prediction model 102 can be trained on training data characterizing a scene that includes one or more agents near an autonomous vehicle, and once trained, the on-board system of the autonomous vehicle can use the behavior prediction model 102 to predict possible behaviors of other road users near the autonomous vehicle. Thus, besides predicting behaviors for other road users, the behavior predictability subsystem 134 can use the same behavior prediction model 102 to generate a behavior prediction output for the vehicle 122 itself, without a need to develop a new behavior prediction model. Thus, the on-board system 120 can save the memory usage on board the vehicle 122.

In some implementations, the behavior prediction model 102 can be a model that is specially developed to generate a behavior prediction output for the vehicle 122 itself. A training system, e.g., the training system 110, can train the behavior prediction model 102 on training data. The training system 110 can be remote from the on-board system 120, e.g., in a data center 112. The training data includes training examples, and each training example characterizes a vehicle, e.g., an autonomous vehicle or a semi-autonomous vehicle, using information observable by other road users in the vicinity of the vehicle. The training system can train the behavior prediction model to generate a behavior prediction output that characterized a predicted future behavior for the vehicle predicted using information observable by other road users.

The behavior predictability subsystem 134 can determine a predictability score 165 for the candidate future behavior 166 using the behavior prediction output generated from the behavior prediction model 102. The behavior predictability subsystem 134 can determine a predictability score 165 for the candidate future behavior 166 by comparing the candidate future behavior 166 with the behavior prediction output generated from the behavior prediction model 102.

In some implementations, the behavior prediction model 102 can generate a plurality of behavior predictions. The behavior predictability subsystem 134 can group or aggregate the behavior predictions, e.g., trajectories, into a plurality of likelihoods for predicted routes. For example, the behavior predictability subsystem 134 can project a plurality of predicted trajectories onto a road graph to generate likelihoods for a plurality of lane segments on the road graph. In some implementations, projecting the plurality of behavior predictions may result in low overlap with a road graph, and the behavior predictability subsystem 134 can generate likelihoods for predicted routes based on intent predictions or action predictions. For example, the behavior prediction model 102 can generate likelihoods for predicted actions, such as turning left, lane change right, stopping, etc. The behavior predictability subsystem 134 can map these predicted actions on a road graph to generate aggregated likelihoods for predicted routes. In some implementations, the behavior predictability subsystem 134 can filter out any predicted trajectories that have a particular action type, e.g., stopping, and the behavior predictability subsystem 134 can group or aggregate the behavior predictions that correspond to moving predictions of the vehicle.

More details of generating the predictability score 165 for the candidate future behavior 166 is described below in connection with FIG. 2A and FIG. 2B.

The behavior predictability subsystem 134 can implement the operations of the behavior prediction model 102, e.g., each layer of a behavior prediction neural network model, by loading a collection of model parameter values 172 that are received from the training system 110. Although illustrated as being logically separated, the model parameter values 172 and the software or hardware modules performing the operations may actually be located on the same computing device or, in the case of an executing software module, stored within the same memory device.

The behavior predictability subsystem 134 can use hardware acceleration or other special-purpose computing devices to implement the operations of the behavior prediction model 102. For example, some operations of some layers of a behavior prediction neural network model may be performed by highly parallelized hardware, e.g., by a graphics processing unit or another kind of specialized computing device. In other words, not all operations of each layer need to be performed by central processing units (CPUs) of the behavior predictability subsystem 134.

The behavior predictability subsystem 134 can provide the behavior predictability score 165 to the planning subsystem 136. When the planning subsystem 136 receives the behavior predictability score 165, the planning subsystem 136 can use the behavior predictability score 165 to make fully-autonomous or semi-autonomous driving decisions, e.g., generate a future behavior 168 of the vehicle 122. The planning subsystem 136 can determine whether to cause the vehicle 122 to perform the candidate future behavior 166 based at least on the predictability score, e.g., by comparing the behavior predictability score 165 with a threshold.

For example, the planning subsystem 136 can determine that the behavior predictability score 165 for a candidate future behavior 166 is higher than a threshold and can thereby determine to perform the candidate future behavior 166. Thus, the future behavior 168 can be the candidate future behavior 166. As another example, the planning subsystem 136 can determine that the behavior predictability score 165 for a candidate future behavior 166 is not higher than a threshold and can thereby determine to not perform the candidate future behavior 166. Thus, the future behavior 168 can be different from the candidate future behavior 166, e.g., can perform a navigation plan before the vehicle 122 receives a reroute request.

In some implementations, the planning subsystem 136 can generate several candidate future behaviors 166 to be performed by the vehicle 122 after a current time point, e.g., in response to a reroute request. The planning subsystem 136 can receive a respective behavior predictability score 165 for each of the several candidate future behaviors 166. The planning subsystem 136 can select a candidate future behavior from the several candidate future behaviors, and the selected candidate future behavior can satisfy a criterion, e.g., having the highest behavior predictability score that is higher than a threshold. In some implementations, the planning subsystem 136 can generate a score for each candidate future behavior based on the behavior predictability score 165 and other factors, e.g., expected time to reach destination, passenger comfort, urgency of the reroute request, etc. The planning subsystem 136 can select a candidate future behavior and the score for the selected candidate future behavior can satisfy a criterion, e.g., having the highest score that is higher than a threshold. The planning subsystem 136 can cause the agent to perform a future behavior 168 that is the selected candidate future behavior.

In some implementations, prior to motion planning, the planning subsystem 136 can determine whether at least one candidate future behavior 166 is predictable, e.g., having a behavior predictability score that satisfies a criteria. If at least one candidate future behavior 166 is predictable, the planning subsystem 136 can select one or more candidate future behaviors and can perform motion planning, e.g., generating fully-specified motion plans, for the selected one or more candidate future behaviors. If none of the candidate future behaviors is predictable, the planning subsystem 136 may decide not to generate motion plans for the vehicle 122.

In some implementations, the on-board system 120, e.g., the behavior predictability subsystem 134, the planning subsystem 136, or both, can generate other safety measures for a candidate future behavior 166. For example, the on-board system 120 can generate a turn consistency score for the candidate future behavior 166 characterizing whether the candidate future behavior 166 results in a future turning behavior that is consistent with a turning behavior signaled by the turn indicator of the vehicle at the current time point. As another example, the on-board system 120 can generate a violation score for the candidate future behavior 166 characterizing whether the candidate future behavior 166 violates a rule of the road in the environment. The on-board system 120 can generate a combined predictability score for the candidate future behavior 166 by combining the behavior predictability score 165, and the other safety measures. The planning subsystem 136 can determine a future behavior 168 of the vehicle 122 based at least on the combined predictability score and can determine whether to cause the vehicle 122 to perform the candidate future behavior 166 based at least on the combined predictability score, e.g., by replacing the predictability score with the combined predictability score in one of the examples above.

In some implementations, the on-board system 120 can provide the behavior predictability score 165 for a candidate future behavior 166 to a control center that controls the navigation of the vehicle 122. As discussed above, the control center can make navigation plans for the vehicle 122 or a fleet of vehicles including the vehicle 122 using information of the scene and other information obtained by the control center. The control center can determine whether to cause the vehicle 122 to perform the candidate future behavior 166 based at least on the behavior predictability score 165.

Figure 2A:
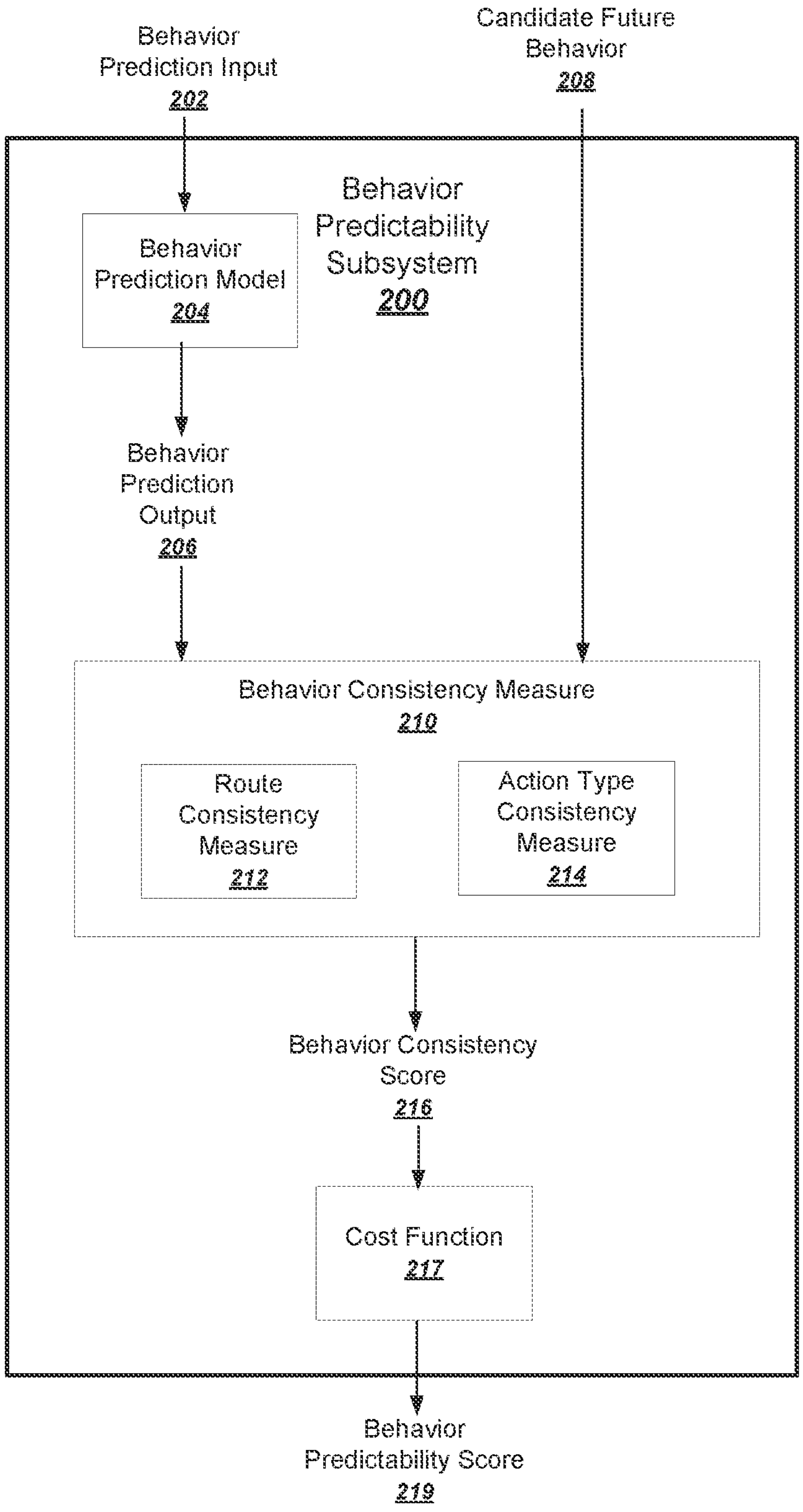
FIG. 2A illustrates an example of generating a predictability score.

FIG. 2A illustrates an example of generating a predictability score. A behavior predictability subsystem 200, e.g., the behavior predictability subsystem 134 of FIG. 1, can be configured to receive a candidate future behavior 208 to be performed by a vehicle, e.g., the vehicle 122, in an environment after a current time point, and to generate a behavior predictability score 219 for the candidate future behavior 208.

In some implementations, the behavior predictability subsystem 200 can generate a behavior predictability score 219 for the candidate future behavior 208 to be performed by a vehicle that is located at a non-intersection in an environment at a current time point. A vehicle that is located at a non-intersection is a vehicle whose distance from any intersection is higher than a threshold. For example, the vehicle is not approaching an intersection, not exiting an intersection, or not waiting at an intersection.

The behavior predictability subsystem 200 can include a behavior prediction model 204 and a behavior consistency measure 210. The behavior prediction model 204 can be configured to receive the behavior prediction input 202 and to process the behavior prediction input 202 to generate a behavior prediction output 206 that characterizes a predicted future behavior for the vehicle after the current time point.

For example, the behavior prediction output 206 can include a predicted route of the vehicle, a predicted trajectory of the vehicle, or a predicted action of the vehicle. In some examples, the behavior prediction output 206 can include a respective score for each of one or more predicted future trajectories for the agent, a respective score for each of one or more predicted future routes for the agent, or a combination of both.

The behavior predictability subsystem 200 can provide the behavior prediction output 206 and the candidate future behavior 208 as inputs to the behavior consistency measure 210. The behavior consistency measure 210 can compare the behavior prediction output 206 and the candidate future behavior 208 to generate a behavior consistency score 216.

In some implementations, the behavior prediction output 206 can include a plurality of behavior prediction trajectories, and the behavior predictability subsystem 200 can determine a predicted route, e.g., lane segments, by grouping or aggregating the behavior prediction trajectories, e.g., by projecting the behavior prediction trajectories to a road graph. In some implementations, the behavior prediction output 206 can include a plurality of action predictions, and the behavior predictability subsystem 200 can determine a predicted route by projecting the action predictions on a road graph. For example, the behavior predictability subsystem 200 can determine the next logical turn segment or lane change segment of a predicted route by projecting the action predictions on a road graph.

The behavior consistency score 216 can characterize whether the behavior prediction output 206 is consistent with the candidate future behavior 208. For example, the behavior consistency score 216 can be based on overlap lengths between a candidate route for the candidate future behavior 208 and a set of predicted routes included in the behavior prediction output 206. In some implementations, the behavior prediction output 206 can include a respective score for each of one or more predicted future trajectories or routes for the agent, and the behavior consistency score 216 can be based on overlap lengths between a candidate route for the candidate future behavior 208 and one or more predicted routes or trajectories included in the behavior prediction output 206. In some implementations, the behavior consistency score 216 can be a heuristic score or a machine learned consistency score. In some implementations, the behavior consistency score 216 can be based on the status of signals of the vehicles, e.g., turn indicators, brake lights, during a previous time interval.

In some implementations, the behavior consistency measure 210 can include a distance metric that compares the behavior prediction output 206 and the candidate future behavior 208. For example, the distance metric can measure the distance between vehicle locations in a candidate trajectory and vehicle locations in a predicted trajectory, or the distance between waypoints in a candidate route and waypoints in a predicted route.

In some implementations, the behavior consistency measure 210 can be a combination of one or more heuristic metrics, e.g., a sum or a multiplication of the one or more heuristic metrics. For example, the behavior consistency measure can be a combination of an action type consistency measure, a turn consistency measure, a rule violation measure, or other heuristic metrics. The heuristic metrics can be determined based on human observations of navigation log data of one or more vehicles, or human driving experiences. In some implementations, some parameters of the heuristic metrics can be determined by analyzing the navigation log data using machine learning.

In some implementations, the behavior consistency measure 210 can include a route consistency measure 212, an action type consistency measure 214, other types of measures, or a combination of these. The behavior predictability subsystem 200 can determine the behavior consistency score 216 based on the route consistency measure 212, the action type consistency measure 214, the other types of measures, or a combination of these.

For example, the candidate future behavior 208 can include a candidate future route for the vehicle, and the behavior prediction output 206 can include a set of predicted routes of the vehicle from the perspective of other road users. The system can use the route consistency measure 212 to determine a route consistency score by comparing the candidate future behavior 208, e.g., the candidate future route for the vehicle, with each of the predicted routes included in the behavior prediction output 206 for the vehicle. For example, for each predicted route, the system can use the route consistency measure 212 to determine the route consistency score by averaging the distances between the waypoints on a road graph of the candidate future route and the predicted route over a plurality of future time points. The behavior predictability subsystem 200 can determine the behavior consistency score 216 based at least on the route consistency scores for the set of the predicted routes.

As another example, the candidate future behavior 208 can include a candidate future action for the vehicle, e.g., lane changing, stopping, speeding up, slowing down, turning left, turning right, etc. The behavior prediction output 206 can include a set of predicted actions of the vehicle from the perspective of other road users. The system can use the action type consistency measure 214 to determine an action type consistency score by comparing the action type of the candidate future behavior 208 with the action type of the behavior prediction output 206 for the vehicle. For example, the system can use the action type consistency measure 214 to determine the action type consistency score by determining whether the action type of the candidate future behavior 208 is related to, or the same as the set of predicted actions included in the behavior prediction output 206. The behavior predictability subsystem 200 can determine the behavior consistency score 216 based at least on the action type consistency scores for the set of predicted actions.

For example, if the action type of the candidate future behavior 208 is the same as the action type of the behavior prediction output 206, e.g., going straight vs going straight, the action type consistency score can be 1. If the action type of the candidate future behavior 208 is the opposite of the action type of the behavior prediction output 206, e.g., going straight vs making a u-turn, the action type consistency score can be 0. If the action type of the candidate future behavior 208 is related to the action type of the behavior prediction output 206, e.g., changing to the left lane while going straight vs going straight at the current moment, the action type consistency score can be 0.5. In some implementations, the behavior predictability subsystem 200 can query a candidate route of the candidate future behavior 208, e.g., determining one or more corresponding lane segments for a turn or lane change, and can determine an action type consistency score by determining whether the direction of the one or more lane segments is consistent with a predicted action included in the behavior prediction output 206.

In some implementations, the behavior predictability subsystem 200 can determine the behavior consistency score 216 using the route consistency measure 212 and the action type consistency measure 214 by combining the two. For example, the behavior consistency score 216 can be computed based on a consistency score for intersection or a consistency score for a non-intersection. The consistency score for intersection can characterize whether the candidate future behavior 208 is predictable for other road users of the environment if the vehicle is within a threshold distance from an intersection at a current time point. The consistency score for the non-intersection can characterize whether the candidate future behavior 208 is predictable for other road users of the environment if the vehicle is not within a threshold distance from an intersection at a current time point.

When the vehicle is within a threshold distance from an intersection at the current time point, the behavior predictability subsystem 200 can distinguish behaviors of different action types or turn types, e.g., left turn vs going straight, based on both the route consistency measure 212 and the action type consistency measure 214. In some implementations, the behavior predictability subsystem 200 can compute the consistency score for intersection from a combination of the route consistency measure 212 and the action type consistency measure 214. In some implementations, because the action type consistency measure 214 is of coarser granularity, the behavior predictability subsystem 200 can give a less weight to the action type consistency measure 214, e.g., consistency score for intersection=route consistency measure+w*action type consistency measure, where w is a constant value between zero and one.

When the vehicle is outside an intersection at the current time point, the action type consistency measure 214 may not be useful. The behavior predictability subsystem 200 can compute the consistency score for a non-intersection only from the route consistency measure 212. In some implementations, the system may not distinguish two close trajectories or routes apart using the route consistency measure 212, and the system can give a less weight to the route consistency measure 212, e.g., consistency score for non-intersection=w*route consistency measure, where w is a constant value between zero and one. In some implementations, the system can give a high weight to the route consistency measure 212. In some implementations, the system can determine the consistency score for intersection or non-intersection using operations, e.g., a max operation, a min operation, an average operation, a median operation, other possible operations, or a combination of these.

In some implementations, the behavior predictability score 219 can be a cost or penalty that is lower when the candidate future behavior 208 is more predictable for the other road users, and is higher when the candidate future behavior 208 is less predictable for the other road users. The behavior predictability subsystem 200 or the planning subsystem 136 can generate the behavior predictability score 219 from the behavior consistency score 216 that characterizes whether the behavior prediction output 206 is consistent with the candidate future behavior 208.

In some implementations, the subsystem can generate the behavior predictability score 219 using a cost function 217 on the behavior consistency score 216, e.g., the consistency score for intersection, or the consistency score for a non-intersection, or both. The cost function 217 can penalize one or more highly unexpected candidate future behaviors which are inconsistent with the behavior prediction output 206. For example, the behavior predictability score 219 output from the cost function 217 can drop sharply for a behavior consistency score 216 that increases from 0 to 0.2, and can be approximately zero for a behavior consistency score 216 that is larger than 0.2.

In some implementations, the behavior predictability score 219 can be a behavior consistency score that is higher when the candidate future behavior 208 is more predictable for the other road users, and is lower when the candidate future behavior 208 is less predictable for the other road users. Thus, the behavior predictability score 219 can be proportional to the behavior consistency score 216, e.g., can be equal to the behavior consistency score 216.

Figure 2B:
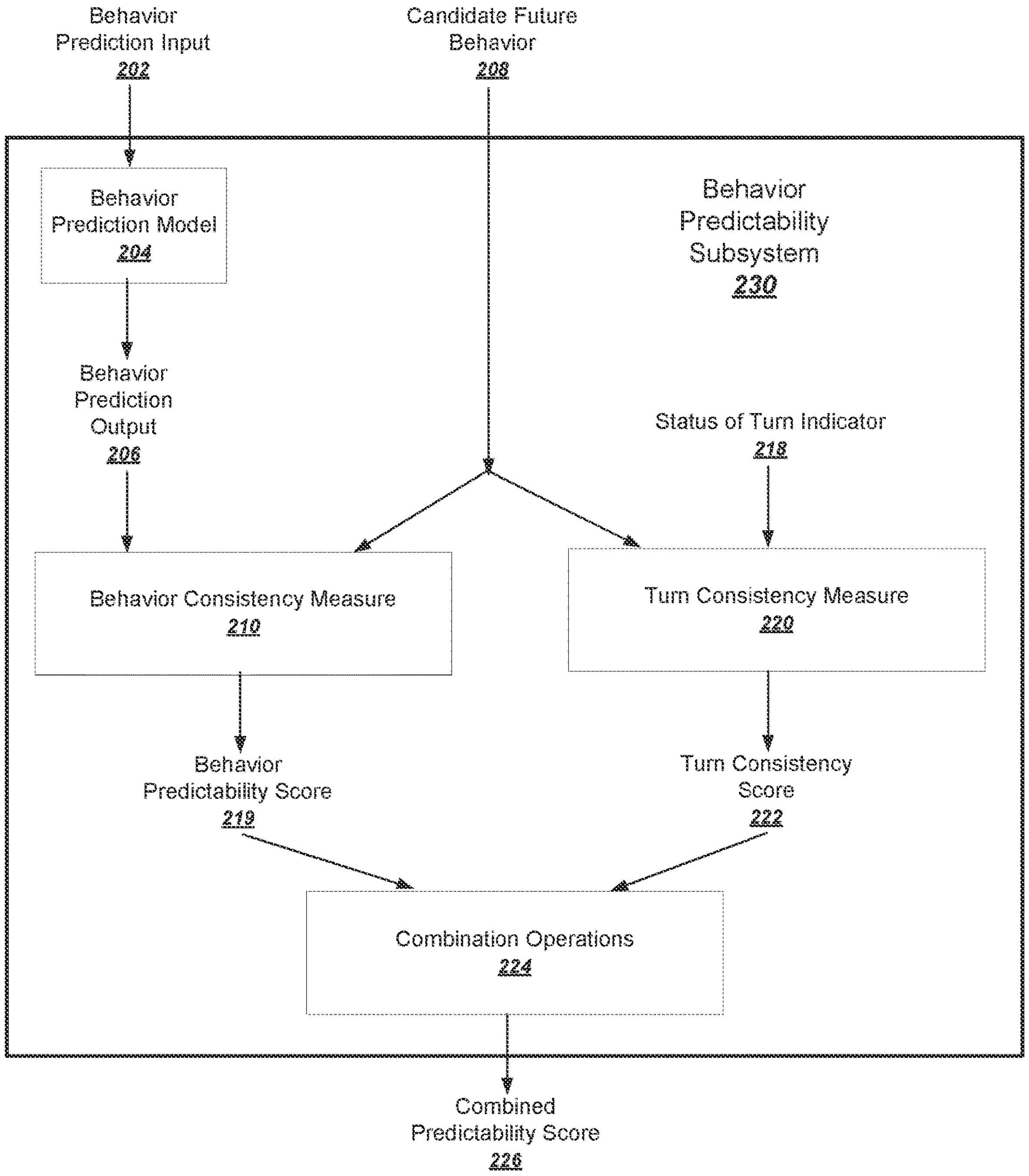
FIG. 2B illustrates an example of generating a combined predictability score.

FIG. 2B illustrates an example of generating a predictability score. A behavior predictability subsystem 230, e.g., the behavior predictability subsystem 134 of FIG. 1, can be configured to receive a candidate future behavior 208 to be performed by a vehicle, e.g., the vehicle 122, in an environment after a current time point, and to generate a combined predictability score 226 for the candidate future behavior 208.

In some implementations, the behavior predictability subsystem 230 can generate a behavior predictability score 219 for the candidate future behavior 208 to be performed by a vehicle that is approaching or inside an intersection in an environment at a current time point. When a vehicle is approaching or is inside an intersection at a current time point, a status of a turn indicator of the vehicle at the current time point can indicate an intent of the vehicle to make a left turn, a right turn, or no turn, at the intersection. Thus, besides generating the behavior predictability score 219 as described above in connection with FIG. 2A, the behavior predictability subsystem 230 can include a turn consistency measure 220 that can be helpful for determining the predictability of the candidate future behavior 208 at or near an intersection.

The system can obtain a status of a turn indicator of the vehicle at the current time point and can provide the status as an input to the turn consistency measure 220. The turn indicator can include a left turn signal or a right turn signal at the front or rear of the vehicle, or other types of signs or information indicating an intent of the vehicle to make a turn or not to make a turn. In some implementations, the intended turn can include a left turn, a right turn, a U-turn, or other types of turns at an intersection.

The system can obtain a turning plan from the candidate future behavior 208 and can provide the turning plan as an input to the turn consistency measure 220. The turning plan can characterize a turn action or a no turn action to be performed by the agent after the current time point if the agent performs the candidate future behavior 208. The system can use the turn consistency measure 220 to determine a turn consistency score 222 for the candidate future behavior 208 by comparing the turning plan for the candidate future behavior 208 with the status of the turn indicator. The turn consistency score for the candidate future behavior 208 can characterize whether the candidate future behavior results in a future turning behavior that is consistent with a turning behavior signaled by the turn indicator of the agent at the current time point.

In some implementations, the turn consistency score 222 can be a cost value, e.g., a value between 0 and 1. The turn consistency score 222 can have a lower value if the status of the turn indicator is consistent with the turning plan for the candidate future behavior 208, indicating less cost or penalty to the selection of the candidate future behavior 208. The turn consistency score 222 can have a higher value if the status of the turn indicator is not consistent with the turning plan for the candidate future behavior 208, indicating more cost or penalty to the selection of the candidate future behavior 208.

For example, if the turn indicator indicates a left or right turn and the turning plan for the candidate future behavior 208 indicates the same turn direction, the turn consistency score 222 can be 0. If the turn indicator indicates a left or right turn and the turning plan for the candidate future behavior 208 indicates an opposite turn direction, the turn consistency score 222 can be 1. If the turn indicator indicates a left or right turn and the turning plan for the candidate future behavior 208 indicates no turn, the turn consistency score 222 can be 0.4. If the turn indicator indicates no turn and the turning plan for the candidate future behavior 208 indicates no turn, the turn consistency score 222 can be 0. If the turn indicator indicates no turn and the turning plan for the candidate future behavior 208 indicates a turn, the turn consistency score 222 can be 0.4.

The behavior predictability subsystem 230 can include a behavior prediction model 204 that is configured to generate a behavior prediction output for the vehicle. The behavior predictability subsystem 230 can include a behavior consistency measure 210 that can be used to generate a behavior predictability score 219 as described above in connection with FIG. 2A.

The behavior predictability subsystem 230 can perform one or more combination operations 224 that combines at least the behavior predictability score 219 and the turn consistency score 222 to generate a combined predictability score 226. For example, the combined predictability score 226 can be a weighted sum, a maximum, or other operations, of the behavior predictability score 219 and the turn consistency score 222.

In some implementations, the behavior predictability subsystem 230 can determine that the agent is likely within a threshold distance from an intersection, e.g., is approaching, leaving, or at an intersection, at the current time point. In response to determining the vehicle is likely near the intersection at the current time point, the behavior predictability subsystem 230 can determine a combined predictability score 226, e.g., including an intersection cost, for the candidate future behavior 208 by combining the turn consistency score 222 for the candidate future behavior 208 and the behavior predictability score 219 for the candidate future behavior 208.

When the vehicle is within a threshold distance from an intersection, the turn consistency score 22 can have a stronger influence on the combined predictability score. In some implementations, the behavior predictability subsystem 230 can generate a turn signal confidence score for the behavior predictability score 219 to reduce the influence coming from the behavior predictability score 219 when the turn indicator of the vehicle at the current time point and the turning plan of the candidate future behavior 208 are not consistent with each other. That is, the intersection cost can be highly correlated with or determined entirely by the turn consistency score when the turn indicator and the turning plan are not consistent with each other.

For example, when the turn indicator and the turning plan are consistent with each other, the turn signal confidence score for the behavior predictability score 219 can be 0.6. When the turn indicator and the turning plan are not consistent with each other, the turn signal confidence score for the behavior predictability score 219 can be 0 or 0.1. The intersection cost can be the maximum of the turn consistency score 222 and a weighted behavior predictability score 219 using the turn signal confidence score.

The turn consistency score 222 can be a cost or penalty to the selection of the candidate future behavior 208. The behavior predictability score 219 can be a cost or penalty to the selection of the candidate future behavior 208. The intersection cost can be a combined cost or penalty to the selection of the candidate future behavior 208. For example, the intersection cost for a vehicle inside an intersection can be formulated as the following:

$$\text{Intersection cost}=\max(\text{turn consistency score}, w\_bp*\text{behavior predictability score}).$$

Here, max( ) is a maximum operation that generates an output that equals the maximum of the two inputs. The w_bp is the weight for the behavior predictability score 219. The w_bp can be computed using the turn signal confidence score and the distance from the vehicle to entering an intersection. For example, w_bp can be equal to sigmoid (distance to entering intersection)*(1 turn signal confidence score). Thus, the weight w_bp can increase before entering an intersection and the system can use the weight w_bp to balance between the turn consistency score 222 and the behavior predictability score 219 within the intersection. The behavior predictability score can correspond to the consistency score for intersection. The calculation for the consistency score for intersection is described above in connection with FIG. 2A.

In some implementations, the behavior predictability subsystem 230 can determine that the vehicle is likely not within a threshold distance from an intersection, e.g., is not approaching or is not at an intersection, at the current time point. In response to determining the vehicle is likely not within a threshold distance from the intersection at the current time point, the behavior predictability subsystem 230 can determine a combined predictability score 226, e.g., including a non-intersection cost, for the candidate future behavior 208 using at least the behavior predictability score 219 for the candidate future behavior 208, without using the turn consistency score 222 for the candidate future behavior 208.

In some implementations, when the vehicle is likely not within a threshold distance from an intersection, the non-intersection cost can be a weighted score of the behavior predictability score 219. For example, the non-intersection cost for a vehicle not within a threshold from an intersection can be formulated as the following:

$$\text{Non-intersection cost}=w\_lane*\text{behavior predictability score}.$$

Here, w_lane can be derived from the lateral distance between the vehicle and its baseline lane when the vehicle is changing a lane from a baseline lane to a target lane at the current time point. The baseline lane is the lane where the vehicle is located at the current time point. For example, w_lane can be a sigmoid function of the lateral distance between the vehicle and its baseline lane. Thus, as the vehicle moves further away from its baseline lane, the non-intersection cost can depend more on the behavior predictability score 219 because the situation becomes more fluid and uncertain. The behavior predictability score can correspond to the consistency score for non-intersection. The calculation for the consistency score for non-intersection is described above in connection with FIG. 2A.

In some implementations, the behavior predictability subsystem 230 can generate the combined predictability score by calculating a combination of the intersection cost and the non-intersection cost using the intersection weight. For example, the combined predictability score can be formulated as the following:

$$\text{Combined predictability score}=w\_intersection*\text{intersection cost}+(1-w\_intersection)*\text{non-intersection cost}.$$

Here, w_intersection is an intersection weight. The intersection weight can be used to weigh on the intersection cost and the non-intersection cost. The behavior predictability subsystem 230 can compute the intersection weight using the distance from the vehicle to entering an intersection and the distance from the vehicle to existing the intersection. For example, the intersection weight can be a product of the sigmoid values of the two distances. In some implementations, the intersection weight can gradually increase before entering an intersection, and can decrease sharply before exiting the intersection.

Figure 3:
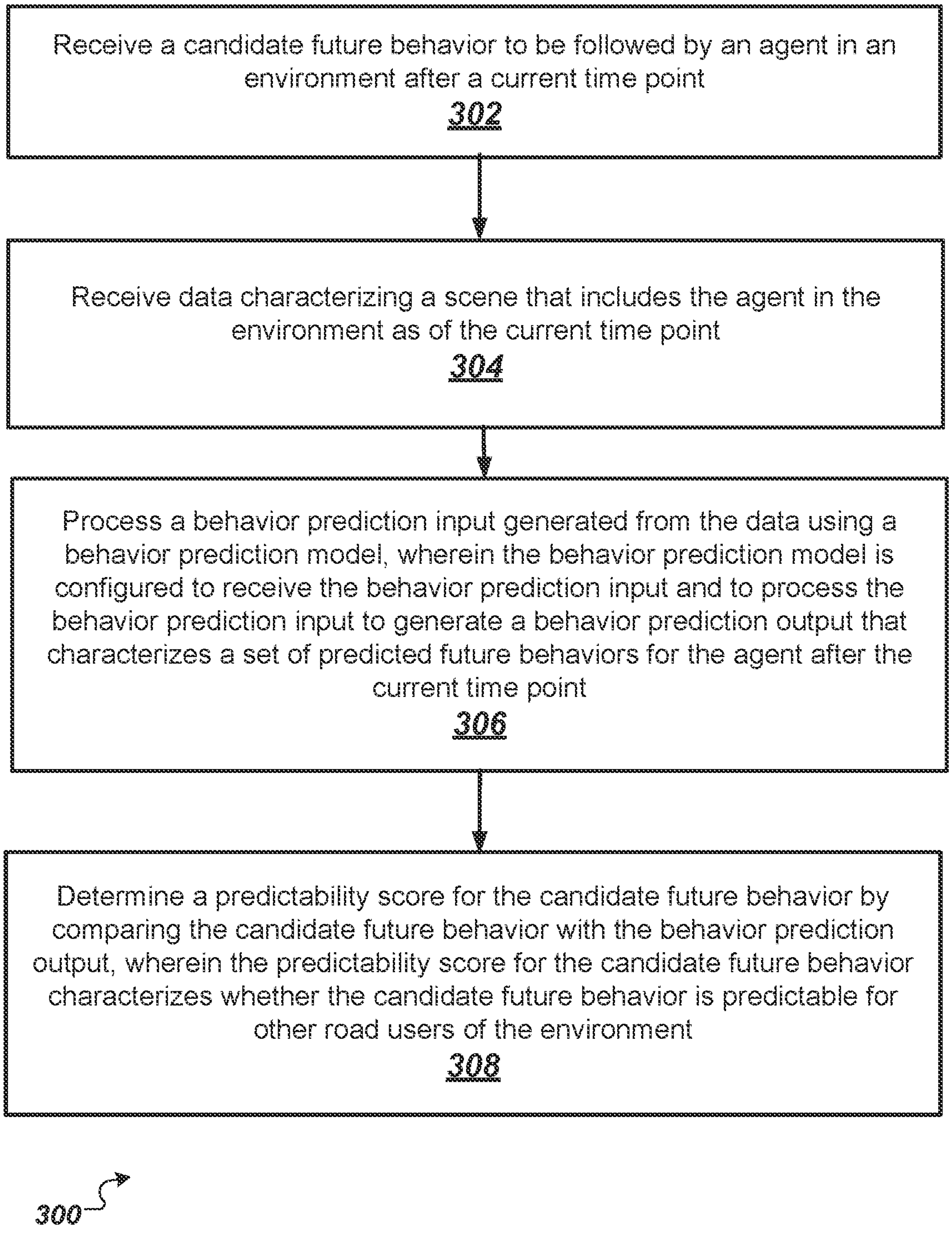
FIG. 3 is a flow chart of an example process for predictability estimation using a behavior prediction model.

FIG. 3 is a flow chart of an example process 300 for predictability estimation using a behavior prediction model. The process will be described as being performed by an appropriately programmed computer system, such as the on-board system 120, the behavior predictability subsystem 134, the planning subsystem 136, or a combination of these.

The system receives a candidate future behavior to be performed by an agent in an environment after a current time point (302). The agent can be a road user in the environment. In some implementations, the agent can be an autonomous vehicle or a semi-autonomous vehicle. In some implementations, the candidate future behavior can be generated in response to a reroute request that may require the agent to change a current navigation plan in the environment. In some implementations, the system, e.g., the planning subsystem 136, can generate a plurality of candidate future behaviors in response to a reroute request that may require the agent to change the current navigation plan.

The system receives data characterizing a scene that includes the agent in the environment as of the current time point (304). In some implementations, the data characterizing the scene can include information that is available to other agents in the environment and may not include any privileged information that is only available to the agent. For example, the agent may have information regarding a destination of the reroute request, but this information may not be available to other agents in the environment. Thus, the data characterizing the scene may not include the information regarding the destination.

The system processes a behavior prediction input generated from the data using a behavior prediction model (306). The behavior prediction model can be configured to receive the behavior prediction input and to process the behavior prediction input to generate a behavior prediction output that characterizes a set of predicted future behaviors for the agent after the current time point. For example, the behavior prediction output can include one or more possible future behaviors that the agent might perform after the current time point estimated based on the behavior prediction input.

The system determines a predictability score for the candidate future behavior by comparing the candidate future behavior with the behavior prediction output (308). The predictability score for the candidate future behavior can characterize whether the candidate future behavior is predictable for other road users of the environment. In some implementations, the other road users can be real road users in the environment. In some implementations, the other road users can be virtual road users that do not exist in the environment, but are placed in the environment by the system. For example, even if the system does not perceive any other road users at the current time point, there is a non-zero probability that a road user may exist in the environment or may appear in the environment. Therefore, the system may still need to determine a predictability score for a candidate future behavior as if a road user is observing and predicting the agent's behavior.

In some implementations, the system can determine a route consistency score by comparing the candidate future behavior for the agent with a set of predicted future behaviors (e.g., predicted routes or predicted trajectories) included in the behavior prediction output for the agent. The system can determine the predictability score for the candidate future behavior based at least on the route consistency score. The behavior prediction output can include the set of predicted future behaviors and corresponding likelihoods for the set of predicted future behaviors.

In some implementations, the system can determine the route consistency score by aggregating across the set of predicted future behaviors, e.g., accumulating the likelihoods as a function of a match score between the candidate future behavior and each predicted future behavior. In some implementations, the system can determine the route consistency score by accumulating the likelihoods of the set of predicted future behaviors using a weighted sum of the likelihoods, and the weight for the respective likelihoods of each predicted future behavior can be the matching score between the candidate future behavior and each predicted future behavior. For each predicted future behavior, the system can calculate the match score by averaging the distances between the waypoints on a road graph of the candidate future route and the predicted route of the predicted future behavior over a future period of time after the current time point.

In some implementations, the system can determine an action type consistency score by comparing an action type of the candidate future behavior for the agent with a set of predicted future actions included in the behavior prediction output for the agent. The system can determine the predictability score for the candidate future behavior based at least on the action type consistency score. The behavior prediction output can include the set of predicted future actions corresponding likelihoods for the set of predicted future actions. Examples of the actions include right turn, left turn, lane change, etc.

In some implementations, the system can determine the action type consistency score by aggregating across the set of predicted future actions, e.g., accumulating the likelihoods as a function of a compatibility score between the action type of the candidate future behavior and each predicted future action. In some implementations, the system can determine the action type consistency score by accumulating the likelihoods of the set of predicted future actions using a weighted sum of the likelihoods, and the weight for the respective likelihoods of each predicted future action can be the compatibility score between the action type of the candidate future behavior and each predicted future action. The compatibility score can measure whether two actions are compatible with each other.

For example, the action type of the candidate future behavior can be a narrow right turn (e.g., a right turn into the right most lane), and a predicted future action can be a wide right turn (e.g., a right turn into the middle lane). Although the routes or trajectories are not an exact match, the actions are compatible with each other. Therefore, the system can generate a high compatibility score between the action type of the candidate future behavior and the predicted future action, and the system can use the high compatibility score to provide a higher weight for the likelihood of the predicted future action when the system computes the action type consistency score by accumulating the likelihoods of the set of predicted future actions.

As another example, the action type of the candidate future behavior can be a right turn, and a predicted future action can be going straight beyond the intersection and then taking a right turn into a parking lot. The system can determine that the actions are not compatible with each other. Therefore, the system can generate a low compatibility score between the action type of the candidate future behavior and the predicted future action, and the system can use the low compatibility score to provide a lower weight for the likelihood of the predicted future action when the system computes the action type consistency score by accumulating the likelihoods of the set of predicted future actions.

In some implementations, the system can obtain a status of a turn indicator of the agent at the current time point. The system can obtain a turning plan for the candidate future behavior. The turning plan can characterize a turn action or a no turn action to be performed by the agent after the current time point. The system can determine a turn consistency score for the candidate future behavior by comparing the turning plan for the candidate future behavior with the status of the turn indicator. The turn consistency score for the candidate future behavior can characterize whether the candidate future behavior results in a future turning behavior that is consistent with a turning behavior signaled by the turn indicator of the agent at the current time point.

In some implementations, the system can determine that the agent is within a threshold distance from an intersection at the current time point. In response to determining the agent is within the threshold distance from the intersection at the current time point, the system can determine a combined score for the candidate future behavior by combining the turn consistency score for the candidate future behavior and the predictability score for the candidate future behavior.

In some implementations, if any one of the candidate future behavior or the behavior prediction output includes a trajectory, the system can project the trajectory to a road graph, e.g., in order to compare the projected trajectory to a route on the road graph.

In some implementations, the candidate future behavior can include a candidate future route to be performed by the agent after the current time point. The behavior prediction output can include a respective likelihood for each of one or more predicted future trajectories for the agent after the current time point. For each of the one or more predicted future trajectories, the system can generate a projection of the predicted future trajectory by projecting the predicted future trajectory to a road graph, and can determine a matching score between the candidate future route and the projection of the predicted future trajectory on the road graph. The system can determine the predictability score for the candidate future behavior by aggregating the respective likelihood for each of the one or more predicted future trajectories using the respective matching score.

For example, the system can project a predicted future trajectory to a road graph in order to generate a projected future route for the agent, and the system can compare the projected future route with the candidate future route on a road graph. For example, for each of the one or more predicted future trajectories, the system can determine a respective matching score by averaging the distances between the locations of the candidate future route and the projection of the predicted future trajectory on the road graph over a future period of time after the current time point. The system can determine the predictability score for the candidate future behavior using a weighted sum of the likelihoods of the predicted future trajectories, and the weight can be the matching score between the candidate future route and the projection of each predicted future trajectory.

In some implementations, the candidate future behavior can include a candidate future route to be performed by the agent after the current time point. The behavior prediction output can include a respective likelihood for each of one or more predicted future routes for the agent after the current time point. For each of the one or more predicted future routes, the system can determine a matching score between the candidate future route and the predicted future route on a road graph. The system can determine the predictability score for the candidate future behavior by aggregating the respective likelihood for each of the one or more predicted future routes using the respective matching score.

For example, for each of the one or more predicted future routes, the system can determine a respective matching score by averaging the distances between the waypoints on a road graph of the candidate future route and waypoints on the road graph of the predicted route of the environment over a future period of time after the current time point. The system can determine the predictability score for the candidate future behavior using a weighted sum of the likelihoods of the predicted future routes, and the weight can be the matching score between the candidate future route and each predicted future route.

Rather than converting the candidate future route to a candidate future trajectory, the system can directly compare the one or more predicted future routes and the candidate future route on a road graph. Mapping and comparing routes may have the benefit of removing noises and changes to decisions between planning iterations because a predicted trajectory can be one of many factors that impact what the actual planned trajectory would be. The behavior predictability score generated by mapping and comparing routes directly can be used to select or prune future candidate behaviors before performing full motion planning for the future candidate behaviors. Thus, the system can make sure that a predictable route is scheduled for full planning.

In some implementations, the candidate future behavior can include a candidate future trajectory to be performed by the agent after the current time point. The behavior prediction output can include a respective likelihood for each of one or more predicted future trajectories for the agent after the current time point. The system can generate a projection of the candidate future trajectory by projecting the candidate future trajectory to a road graph. For each of the one or more predicted future trajectories, the system can generate a projection of the predicted future trajectory by projecting the predicted future trajectory to the road graph, and can determine a matching score between the projection of the candidate future trajectory and the projection of the predicted future trajectory on the road graph. The system can determine the predictability score for the candidate future behavior by aggregating the respective likelihood for each of the one or more predicted future trajectories using the respective matching score.

In some implementations, the candidate future behavior can include a candidate future trajectory to be performed by the agent after the current time point. The behavior prediction output can include a respective likelihood for each of one or more predicted future routes for the agent after the current time point. The system can generate a projection of the candidate future trajectory by projecting the candidate future trajectory to a road graph. For each of the one or more predicted future routes, the system can determine a matching score between the candidate future trajectory and the predicted future route on the road graph. The system can determine the predictability score for the candidate future behavior by aggregating the respective likelihood for each of the one or more predicted future routes using the respective matching score.

In some implementations, the system can determine a violation score for the candidate future behavior by comparing the candidate future behavior with a rule of a road in the environment. The system can determine a combined score for the candidate future behavior by combining at least the violation score for the candidate future behavior and the predictability score for the candidate future behavior. For example, if a candidate future behavior requires a vehicle to use a carpool lane and the status of the vehicle does not satisfy the condition to use the carpool lane, the system can determine a violation score as a cost or penalty to the selection of the candidate future behavior. The violation score in this instance when the vehicle does not satisfy the condition to use the carpool lane can be higher than the violation score when the vehicle satisfies the condition to use the carpool lane.

In some implementations, the system can determine whether to cause the agent to perform the candidate future behavior based at least on the predictability score. In some implementations, the system can receive a plurality of candidate future behaviors to be performed by the agent in the environment after the current time point. The system can determine a respective predictability score for each candidate future behavior of the plurality of candidate future behaviors by comparing each candidate future behavior with the behavior prediction output. In some implementations, the system can select a future behavior that the agent can perform from a plurality of candidate future behaviors based at least on the predictability score for the plurality of candidate future behaviors. The predictability score for the future behavior can satisfy a criterion. For example, if the predictability score characterizes a consistency between the behavior prediction output and the candidate future behavior, the predictability score for the future behavior can be higher than a threshold. If the predictability score characterizes a cost or penalty for selecting the candidate future behavior, the predictability score for the future behavior can be lower than a threshold.

In some implementations, the system can select a sub-optimal candidate future behavior, e.g., a sub-optimal route, from a plurality of candidate future behaviors. Although the optimal candidate future behavior may include an optimal route (e.g., shortest time to arrive at a destination, shortest distance to a destination, etc.) for the destination of the reroute request, the optimal candidate future behavior may correspond to a route that is inconsistent with a previously signaled intent by the agent. The system can select a sub-optimal route that is more consistent with the previously signaled intent using the predictability scores for the plurality of candidate future behaviors.

In some implementations, because the system can more accurately evaluate the predictability for each of a plurality of candidate future behaviors, the system can select an optimal candidate future behavior that the agent can perform after the current time point. Instead of being overly cautious about selecting the optimal candidate future behavior, e.g., an optimal route for a destination, the system can determine to select the optimal candidate future behavior if the predictability score for the optimal candidate future behavior satisfies a criterion, e.g., if the predictability score characterizes a penalty that is lower than a threshold.

In some implementations, the system can provide the predictability score to a control system that controls the agent, and in some cases, controls the agent and some other agents. The control system can make a control decision that controls the agent, some other agents, or both, using the predictability score for the candidate future behavior.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising receiving, at a current time point and by an on-board system of an autonomous vehicle, a reroute request to change a current navigation plan: of the autonomous vehicle in an environment by performing a candidate future behavior after the current time point;

based on receiving the reroute request, determining a predictability score for the candidate future behavior that characterizes whether the candidate future behavior is predictable for the other road users of the environment, by:

receiving, by the on-board system of the autonomous vehicle, data characterizing a scene that includes the autonomous vehicle and one or more other road users in the environment as of the current time point;

processing, by the on-board system of the autonomous vehicle, a behavior prediction input generated from the data using a behavior prediction model to generate a behavior prediction output that characterizes a set of predicted future behaviors for the autonomous vehicle after the current time point;

for each predicted future behavior of the set of predicted future behaviors, determining a respective matching score; and determining the predictability score from the respective matching scores for the predicted future behaviors; and controlling the autonomous vehicle using the predictability score.

2. The method of claim 1, wherein determining the predictability score for the candidate future behavior comprises:

determining a route consistency score by comparing the candidate future behavior for the autonomous vehicle with the set of predicted future behaviors included in the behavior prediction output for the autonomous vehicle; and determining the predictability score for the candidate future behavior based at least on the route consistency score.

3. The method of claim 1, wherein determining the predictability score for the candidate future behavior comprises:

determining an action type consistency score by comparing an action type of the candidate future behavior for the autonomous vehicle with a set of predicted future actions included in the behavior prediction output for the autonomous vehicle; and determining the predictability score for the candidate future behavior based at least on the action type consistency score.

4. The method of claim 1, further comprising:

obtaining a status of a turn indicator of the autonomous vehicle at the current time point;

obtaining a turning plan for the candidate future behavior, wherein the turning plan characterizes a turn action or a no turn action to be performed by the autonomous vehicle after the current time point; and determining a turn consistency score for the candidate future behavior by comparing the turning plan for the candidate future behavior with the status of the turn indicator, wherein the turn consistency score for the candidate future behavior characterizes whether the candidate future behavior results a future turning behavior that is consistent with a turning behavior signaled by the turn indicator of the autonomous vehicle at the current time point.

5. The method of claim 4, further comprising:

determining that the autonomous vehicle is within a threshold distance from an intersection at the current time point; and in response to determining the autonomous vehicle is within the threshold distance from the intersection at the current time point, determining a combined score for the candidate future behavior by combining the turn consistency score for the candidate future behavior and the predictability score for the candidate future behavior.

6. The method of claim 1, further comprising:

determining whether to cause the autonomous vehicle to perform the candidate future behavior based at least on the predictability score.

7. The method of claim 1, wherein the candidate future behavior comprises a candidate future route to be performed by the autonomous vehicle after the current time point, wherein the behavior prediction output comprises a respective likelihood for each of one or more predicted future trajectories for the autonomous vehicle after the current time point, wherein determining the predictability score for the candidate future behavior comprises:

for each of the one or more predicted future trajectories, generating a predicted future route derived from the predicted future behavior by generating a projection of the predicted future trajectory by projecting the predicted future trajectory to a road graph; and determining the respective matching score between the candidate future route and the predicted future route; and determining the predictability score for the candidate future behavior by aggregating the respective likelihood for each of the one or more predicted future trajectories using the respective matching score.

8. The method of claim 1, wherein the candidate future behavior comprises a candidate future route to be performed by the autonomous vehicle after the current time point, wherein the behavior prediction output comprises a respective likelihood for each of one or more predicted future routes for the autonomous vehicle after the current time point, wherein determining the predictability score for the candidate future behavior comprises:

for each of the one or more predicted future routes, determining the respective matching score between the candidate future route and the predicted future route; and determining the predictability score for the candidate future behavior by aggregating the respective likelihood for each of the one or more predicted future routes using the respective matching score.

9. The method of claim 1, wherein the candidate future behavior comprises a candidate future trajectory to be performed by the autonomous vehicle after the current time point, wherein the behavior prediction output comprises a respective likelihood for each of one or more predicted future trajectories for the autonomous vehicle after the current time point, wherein determining the predictability score for the candidate future behavior comprises:

generating a candidate future route derived from the candidate future behavior by generating a projection of the candidate future trajectory by projecting the candidate future trajectory to a road graph;

for each of the one or more predicted future trajectories, generating a predicted future route derived from the predicted future behavior by generating a projection of the predicted future trajectory by projecting the predicted future trajectory to the road graph; and determining the respective matching score between the candidate future route and the predicted future route; and determining the predictability score for the candidate future behavior by aggregating the respective likelihood for each of the one or more predicted future trajectories using the respective matching score.

10. The method of claim 1, wherein the candidate future behavior comprises a candidate future trajectory to be performed by the autonomous vehicle after the current time point, wherein the behavior prediction output comprises a respective likelihood for each of one or more predicted future routes for the autonomous vehicle after the current time point, wherein determining the predictability score for the candidate future behavior comprises:

generating a candidate future route derived from the candidate future behavior by generating a projection of the candidate future trajectory by projecting the candidate future trajectory to a road graph;

for each of the one or more predicted future routes, generating a predicted future route derived from the predicted future behavior from the predicted future route; and determining the respective matching score between the candidate future route and the predicted future route; and determining the predictability score for the candidate future behavior by aggregating the respective likelihood for each of the one or more predicted future routes using the respective matching score.

11. The method of claim 1, further comprising:

determining a violation score for the candidate future behavior by comparing the candidate future behavior with a rule of a road in the environment; and determining a combined score for the candidate future behavior by combining at least the violation score for the candidate future behavior and the predictability score for the candidate future behavior.

12. The method of claim 1, comprising:

receiving a plurality of candidate future behaviors to be performed by the autonomous vehicle in the environment after the current time point; and determining a respective predictability score for each candidate future behavior of the plurality of candidate future behaviors by comparing each candidate future behavior with the behavior prediction output.

13. A system comprising one or more computers and one or more storage devices storing instructions that when executed by the one or more computers cause the one or more computers to perform operations comprising:

receiving, at a current time point and by an on-board system of an autonomous vehicle, a reroute request to change a current navigation plan of the autonomous vehicle in an environment by performing a candidate future behavior after the current time point;

based on receiving the reroute request, determining a predictability score for the candidate future behavior that characterizes whether the candidate future behavior is predictable for the other road users of the environment, by:

receiving, by the on-board system of the autonomous vehicle, data characterizing a scene that includes the autonomous vehicle and one or more other road users in the environment as of the current time point;

processing, by the on-board system of the autonomous vehicle, a behavior prediction input generated from the data using a behavior prediction model to generate a behavior prediction output that characterizes a set of predicted future behaviors for the autonomous vehicle after the current time point;

for each predicted future behavior of the set of predicted future behaviors, determining a respective matching score; and determining the predictability score from the respective matching scores for the predicted future behaviors,; and controlling the autonomous vehicle using the predictability score.

14. The system of claim 13, wherein determining the predictability score for the candidate future behavior comprises:

determining a route consistency score by comparing the candidate future behavior for the autonomous vehicle with the set of predicted future behaviors included in the behavior prediction output for the autonomous vehicle; and determining the predictability score for the candidate future behavior based at least on the route consistency score.

15. The system of claim 13, wherein determining the predictability score for the candidate future behavior comprises:

determining an action type consistency score by comparing an action type of the candidate future behavior for the autonomous vehicle with a set of predicted future actions included in the behavior prediction output for the autonomous vehicle; and determining the predictability score for the candidate future behavior based at least on the action type consistency score.

16. The system of claim 13, the operations further comprise:

obtaining a status of a turn indicator of the autonomous vehicle at the current time point;

obtaining a turning plan for the candidate future behavior, wherein the turning plan characterizes a turn action or a no turn action to be performed by the autonomous vehicle after the current time point; and determining a turn consistency score for the candidate future behavior by comparing the turning plan for the candidate future behavior with the status of the turn indicator, wherein the turn consistency score for the candidate future behavior characterizes whether the candidate future behavior results a future turning behavior that is consistent with a turning behavior signaled by the turn indicator of the autonomous vehicle at the current time point.

17. One or more non-transitory computer-readable storage media storing instructions that when executed by one or more computers cause the one or more computers to perform operations comprising:

receiving, at a current time point and by an on-board system of an autonomous vehicle, a reroute request to change a current navigation plan of the autonomous vehicle in an environment by performing a candidate future behavior after the current time point;

based on receiving the reroute request, determining a predictability score for the candidate future behavior that characterizes whether the candidate future behavior is predictable for the other road users of the environment, by:

receiving, by the on-board system of the autonomous vehicle, data characterizing a scene that includes the autonomous vehicle and one or more other road users in the environment as of the current time point;

processing, by the on-board system of the autonomous vehicle, a behavior prediction input generated from the data using a behavior prediction model to generate a behavior prediction output that characterizes a set of predicted future behaviors for the autonomous vehicle after the current time point;

for each predicted future behavior of the set of predicted future behaviors, determining a respective matching score; and determining the predictability score from the respective matching scores for the predicted future behaviors; and controlling the autonomous vehicle using the predictability score.

18. The system of claim 13, wherein the candidate future behavior comprises a candidate future route to be performed by the autonomous vehicle after the current time point, wherein the behavior prediction output comprises a respective likelihood for each of one or more predicted future trajectories for the autonomous vehicle after the current time point, wherein determining the predictability score for the candidate future behavior comprises:

for each of the one or more predicted future trajectories, generating a predicted future route derived from the predicted future behavior by generating a projection of the predicted future trajectory by projecting the predicted future trajectory to a road graph; and determining the respective matching score between the candidate future route and the predicted future route; and determining the predictability score for the candidate future behavior by aggregating the respective likelihood for each of the one or more predicted future trajectories using the respective matching score.

19. The system of claim 13, wherein the candidate future behavior comprises a candidate future route to be performed by the autonomous vehicle after the current time point, wherein the behavior prediction output comprises a respective likelihood for each of one or more predicted future routes for the autonomous vehicle after the current time point, wherein determining the predictability score for the candidate future behavior comprises:

for each of the one or more predicted future routes, determining the respective matching score between the candidate future route and the predicted future route; and determining the predictability score for the candidate future behavior by aggregating the respective likelihood for each of the one or more predicted future routes using the respective matching score.

20. The system of claim 16, further comprising:

determining that the autonomous vehicle is within a threshold distance from an intersection at the current time point; and in response to determining the autonomous vehicle is within the threshold distance from the intersection at the current time point, determining a combined score for the candidate future behavior by combining the turn consistency score for the candidate future behavior and the predictability score for the candidate future behavior.

* * * * *